US008117446B2

(12) United States Patent
Dorfman

(10) Patent No.: US 8,117,446 B2
(45) Date of Patent: Feb. 14, 2012

(54) METHOD AND SYSTEM FOR SECURED REAL TIME PROTOCOL IN SCALABLE DISTRIBUTED CONFERENCE APPLICATIONS

(75) Inventor: Masha Dorfman, Rishon LeTzion (IL)

(73) Assignee: Interwise Ltd., Ben Gurion Airport (IL)

( * ) Notice: Subject to any disclaimer, the term of this patent is extended or adjusted under 35 U.S.C. 154(b) by 891 days.

(21) Appl. No.: 11/774,926

(22) Filed: Jul. 9, 2007

(65) Prior Publication Data
US 2009/0016531 A1    Jan. 15, 2009

(51) Int. Cl.
*H04L 9/32* (2006.01)
(52) U.S. Cl. ........................ 713/168; 380/275
(58) Field of Classification Search .............. 380/275; 713/161, 163, 168, 170, 179, 181; 726/13, 726/29; 709/204
See application file for complete search history.

(56) References Cited

U.S. PATENT DOCUMENTS

| 7,426,636 | B1 * | 9/2008 | McGrew et al. | 713/160 |
| 7,577,156 | B2 * | 8/2009 | Signaoff et al. | 370/401 |
| 2006/0161791 | A1 * | 7/2006 | Bennett | 713/193 |
| 2007/0083918 | A1 * | 4/2007 | Pearce et al. | 726/5 |
| 2007/0294346 | A1 * | 12/2007 | Moore et al. | 709/204 |
| 2008/0016156 | A1 * | 1/2008 | Miceli et al. | 709/204 |
| 2008/0310636 | A1 * | 12/2008 | Bennett | 380/277 |

FOREIGN PATENT DOCUMENTS

WO     2008/099375     8/2008

* cited by examiner

*Primary Examiner* — Beemnet Dada
(74) *Attorney, Agent, or Firm* — Greenblum & Bernstein, P.L.C.

(57) ABSTRACT

A method of providing secured teleconference in a distributed teleconference system including providing one or more servers interconnected in a distributed structure, providing at least two participants which include at least one speaker; where each participant is a listener. Each participant is connected to a server and is associated with a secured teleconferencing application, encrypting the data that is created by the speaker's application, building an authentication tag by the speaker application, transmitting a media packet by the speaker's application to the connected server, checking authentication tag validity by each server that receives a media packet and selectively distributing the media packet if the authentication tag check succeeded and checking authentication tag validity by each listener that receives a media packet and decryption of the encrypted data provided that the authentication tag validity check succeeded.

11 Claims, 2 Drawing Sheets

METHOD AND SYSTEM FOR SECURED REAL TIME PROTOCOL IN SCALABLE DISTRIBUTED CONFERENCE APPLICATIONS

FIELD OF THE INVENTION

The present invention relates generally to the field of secured real time protocol (SRTP) and more particularly to a method and system for implementing SRTP in distributed teleconference applications.

BACKGROUND OF THE INVENTION

While the use of teleconferencing is continuously growing there is a growing demand for secured communication in teleconferencing. The need to provide secured communication in teleconferencing sessions imposes a technical challenge as the number of active participants in a single teleconference is expected to keep growing in the future.

Secured communication consists of two principal requirements: encryption of the data and authentication of the data source, i.e. the sender. Generally for the purpose of authentication the source of data should not necessarily be identified as an individual or single entity, but may also be identified as a valid member of a group.

In distributed conferencing systems a packet of data is transmitted by a speaker and is distributed to all other participants through a group of servers. According to the common practice that is performed in non distributed conference application, each server needs to authenticate the data source, to decrypt the payload of the packet and then re-encrypt the payload, clone the packet for each destination that the packet is designated to, and re-calculate and attach an authentication tag for each destination that the packet is designated to. This list of actions is time consuming and when the number of participants in a conferencing session exceeds a certain amount it will be no longer possible to guarantee reasonable end to end distribution times as required by real time applications.

Current secured teleconferencing methods and systems are heavy CPU consumers and suffer from long latencies in the media passage. There is a need for a method and a system that enables to reduce the time that each packet is handled by the servers in a teleconference application in order to guarantee reasonable performance in scalable secured teleconferencing sessions.

PCT/IL2007/000202, filed on Feb. 13, 2007 "Method and system for controlling a distributed data flow environment" (referred to as "data control method application") describes a method for controlling data flow in a distributed system. The data control method application refers to a distributed system that defines also an hierarchical structure of servers where each or part of the servers are provided with the number of active speakers in the system, and whenever a server gets data from a son-server or from a client it can decide whether to distribute the received data or block it according to some parameters including the number of active speakers, a predefined number N of maximal active speaker and additional arguments e.g. if a specific data sender is defined as a high priority sender. Each server or part of the servers when deciding not to distribute the received data also send a control message to the sender (source/creator of the received data) to stop sending messages—in this way the load on the network is reduced and its efficiency improves. However, for implementing this method, the server must be able to identify each speaker/sender.

SUMMARY OF THE INVENTION

An aspect of an embodiment of the invention relates to a method and system of transferring secured real time protocol (SRTP) wherein the encrypted data is transferred through media servers, optionally without being decrypted at any of the media servers, and wherein a single authentication tag is associated with each media packet throughout ifs entire path through the media servers.

It is further an object of the invention to provide a method and system for distribution of media packet to participants of a teleconference session, wherein the method and system guarantee the capability of media data distribution in scalable teleconference sessions with short latencies and with usage of relatively low computing resources.

It is further an object of the invention to provide a method and system for secured real time protocol in a teleconference session that enables to control the distribution of data with reference to the data source and to the number of active speakers at a given moment in the teleconference session.

In an exemplary embodiment of the invention, the method comprises providing one or more servers interconnected in a distributed structure, providing at least two participants which include at least one speaker; where each participant is a listener each participant is connected to a server and is associated with a secured teleconferencing application, encrypting the data that is created by the speaker's application, building an authentication tag by the speaker application, transmitting a media packet by the speaker's application to the connected server, checking authentication tag validity by each server that receives a media packet and selectively distributing the media packet if the authentication tag check succeeded; and checking authentication tag validity by each listener that receives a media packet and decryption of the encrypted data provided that the authentication tag validity check succeeded.

In some embodiments of the invention each speaker's application, prior to transmitting a media packet to the connected server adds to the media packet a unique identification indication.

In some embodiments of the invention each speaker's application, prior to transmitting a media packet to the connected server adds to the media packet a header including a unique SSRC.

In some embodiments of the invention, selectively distributing the media packet depends on the number of active speakers.

In an exemplary embodiment of the invention, selectively distributing the media packet depends on the number of active speakers and on the identity of the media data source.

In an exemplary embodiment of the invention, encrypting the data that is created by the speaker's application is performed by using a key that is provided by the system for each participant.

In an exemplary embodiment of the invention, selectively distributing the media packet depends on decryption and getting information from all or part of the media packets that are received by the server.

In an exemplary embodiment of the invention, selectively distributing the media packet depends on decryption and getting information on voice volume from all or part of the media packets that are received by the server.

In an exemplary embodiment of the invention, the same media packet is transmitted to all the connected clients and connected servers without changing the content of the received media packet.

BRIEF DESCRIPTION OF THE DRAWINGS

The present invention will be understood and appreciated more fully from the following detailed description taken in conjunction with the drawings. Identical structures, elements or parts, which appear in more than one figure, are generally labeled with a same or similar number in all the figures in which they appear, wherein.

DETAILED DESCRIPTION OF THE INVENTION

In PCT/IL2007/000202 filed on Feb. 13, 2007 the disclosures of which are incorporated herein by reference there are described elements, methods and systems for providing efficient distributed teleconferencing systems. The current application adds a layer of data security to the concepts described in the above application to provide suitable secured distributed teleconference systems and methods.

Figure 1:
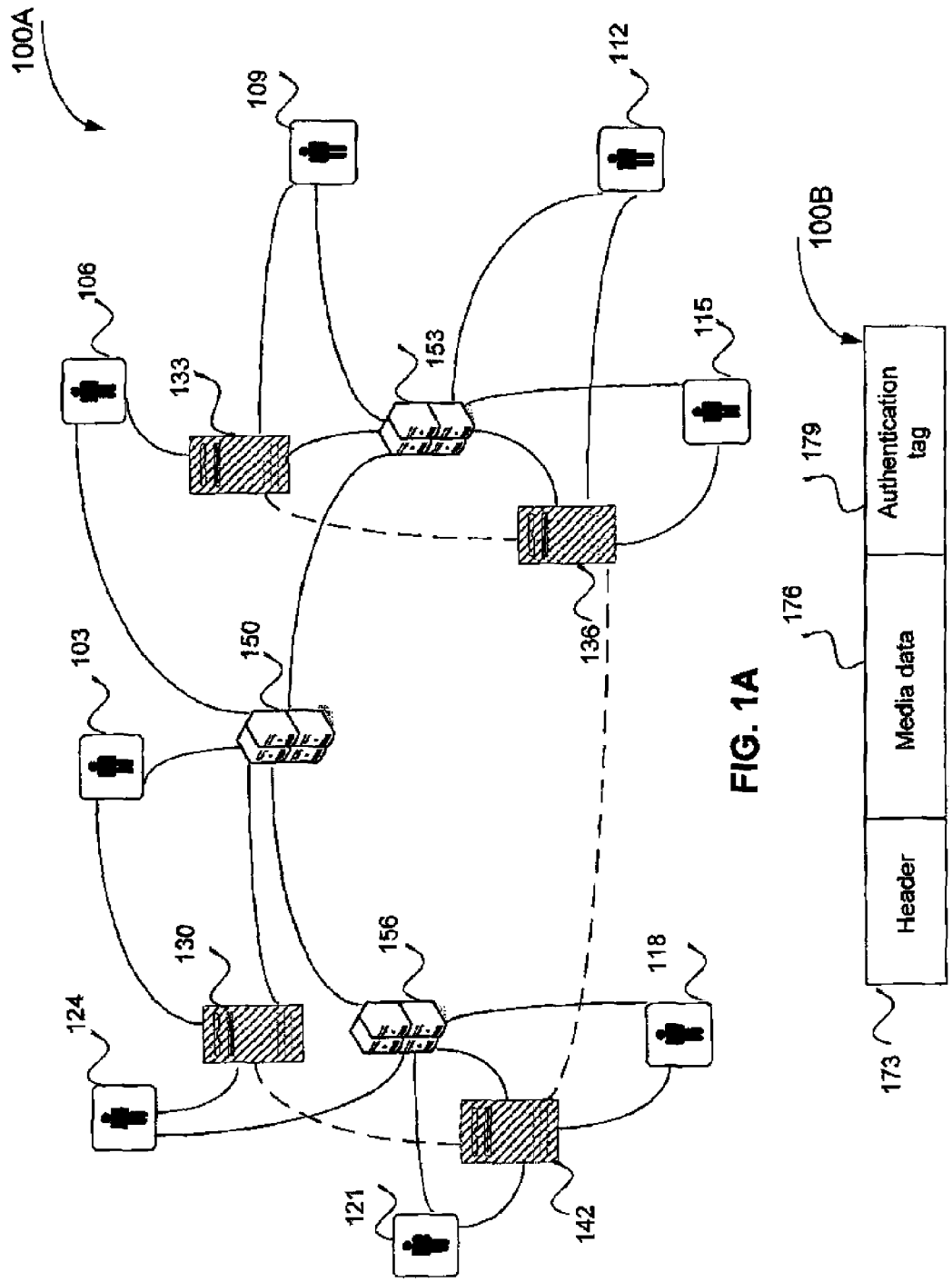
FIG. 1A is a schematic illustration of a teleconferencing system including the data servers, signaling servers and teleconference participants according to a preferred embodiment of the invention.
FIG. 1B is a schematic illustration of a media packet that is transferred in a teleconferencing system according to a preferred embodiment of the invention.

FIG. 1 shows a schematic illustration of a teleconferencing system 100A. The system includes eight participants 103, 106, 109, 112, 115, 118, 121 and 124. In teleconferencing systems any participant may be defined as speaker or just listener, (while speaker typically includes also the ability to listen), in the system 100A every participants is defined as speaker.

The system 100A further includes two networks of servers: four media servers 130, 133, 136 and 142, and three signaling servers 150, 153 and 156.

As shown in FIG. 1A, each media server (referred to as server) is connected to one signaling server. The media servers serve to intercept media packets that contain information that was created by the speakers and transfer the media packets across the server's network until the media packets will reach all the listeners. Exemplary policies and algorithms that are used by the server's network are described in the data control application. The media servers are connected between themselves to support both distributed and hierarchical structure. For example media server 136 can be defined as the top (root) having two sons 133, 142 and media server 142 having one son 130. As explained in the data control method application connections additional connections between the media servers, (e.g. a connection between media servers 130 and 133) are optional as long as the hierarchical structure remains defined.

The signaling server's network is responsible to support all the servers and the participants with security parameters, actual cryptographic context, handles the initialization and terminations of sessions, connection of participants and servers and additional tasks. However the overall functionality of the signaling server's network is beyond the scope of this description. The separation of the network to two different physical networks is not mandatory, thus in an exemplary embodiment of the invention the signaling server's network functionality is merged into the server's network.

FIG. 1B shows a schematic general structure of a media packet 170 that is created by a speaker. The media packets are defined to support various algorithms of secured real time protocol e.g. AWS-128 & HMAC-SHA1 encryption by AES algorithm and HMAC-SHA authentication algorithm. In an exemplary embodiment according to the present invention the media packet includes three sections of data: the first section is a header 173. In an exemplary embodiment of the invention the header includes a synchronization source (SSRC) typically 32 bits long. The header further includes a sequential packet number and additional information as required by the SRTP protocol. The second section of the media packet 176 is the payload—i.e. the media data that was created by the speaker—such as voice or video. As shall be further explained, when the teleconferencing system provides data security the payload section should be encrypted. The third section of the media packet is an authentication tag (referred to as "tag") 179. The tag is a unique data string that serves for verifying that a media packet was originated by an approved source. While the detailed theory of secured communication is beyond the scope of this description it is known in the art that there are certified methods to identify each participant in a teleconferencing system either as an individual or as a member of a predefined group, in order to prevent from data that was originated by a non-approved third party to be distributed and merge with certified speaker's data. As was described in the data control method application there may be also other types of packets being transferred across the network, such as control packets. However his invention relates basically to the method of handling media packets, which are practically the cause to delays and latencies in secured teleconferencing systems.

Figure 2:
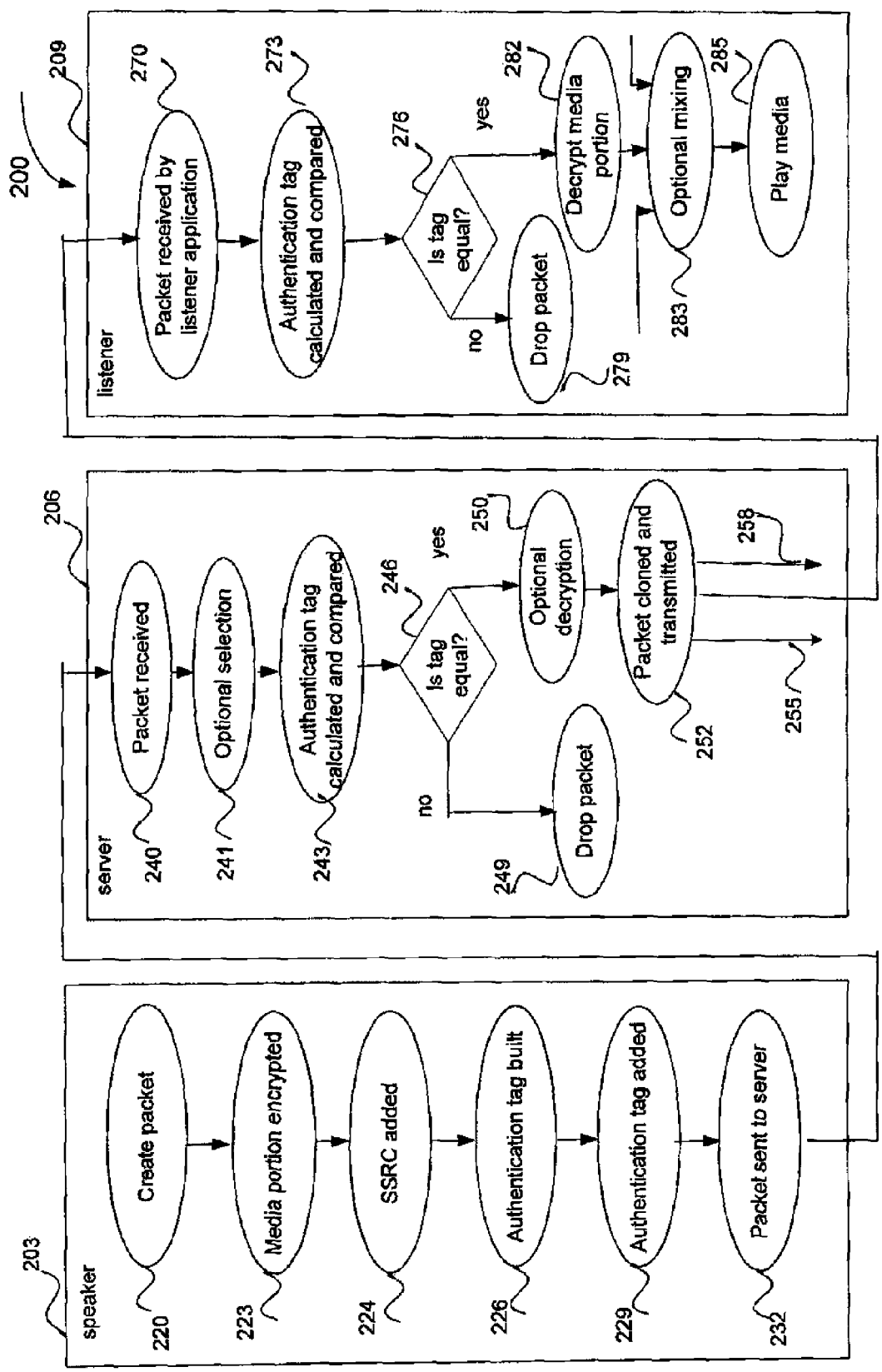
FIG. 2 is a flowchart describing the steps that are performed along the path of one media packet from a speaker to a listener through one or more servers.

FIG. 2 shows a flowchart 200 that describes the steps that are performed along the path of one media packet from a speaker to a listener through one or more servers. The flowchart describes the steps that are taken by a speaker 203, one or more servers 206 and a listener 209.

The process is described from the moment that a speaker gathers data (referred to as "media data"), for example digital representation of speech and creates a media packet (220). Since the teleconference should provide security, the media data is encrypted (223). The media data encryption is performed by using a predefined encryption method which requires that the speaker will be provided with encryption information (referred to as "key") such as a private encryption key. The system may provide each speaker with a different key or provide all the speakers with the same key, or alternatively provide sub groups of the speakers with different keys. Typically the responsibility to provide this encryption information (keys) is part of the signaling server's network, i.e. as part of the teleconferencing system initialization each speaker should be provided with a key that will enable the speaker to calculate/build an authentication tag. While the teleconferencing according to the present method and system may be scalable, practically enabling unlimited number of new speakers to join the conference, the system should provide each new speaker with key or equivalent information.

In an exemplary embodiment of the invention, the speaker composes a packet's header which includes a synchronization source number (SSRC) (224). In order to guarantee an efficient secured RTP according to the present invention, the SSRC is unique for each speaker in the teleconferencing environment. In an exemplary embodiment according to the present invention, the unique SSRC is provided to each speaker by the signaling server's network. Thus, at the initialization of the teleconferencing session each speaker is provided with a unique SSRC, and during the teleconferencing session each new speaker that joins the session is provided with a unique SSRC. In an exemplary embodiment of the present invention each or part of the servers are provided with information that enables the server to identify the sender of each packet by the SSRC that is included in each such packet.

In an exemplary embodiment of the invention the speaker application then builds an authentication tag (226) which is calculated according to control data that is provided by the signaling server's network. The authentication tag is an essential requirement of a secured teleconference system, which is needed to assure a unique identification to each speaker in the system. The authentication tag is later checked at every server on the media packet's path in order to filter out non-approved speakers. The authentication tag is added to the media packet (229). At this stage the media packet is complete and is sent to its parent sever (232) in order to be distributed through the entire teleconference system.

It should be noted that the order in which the speaker creates the header and media data is interchangeable, thus, steps (223) and (224) may be reordered since the SSRC and media data encryption are independent steps.

The media packet is then received by a server (240). Since each packet includes a unique SSRC, the server is able to take a decision whether to forward the specific packet or to block its distribution according to its source (i.e. the speaker). As was described in detail in the data control method application the server may optionally block packets that were sent by a certain speaker if the number of active speakers reaches a predefined limit (241). This decision can be taken without the need to decrypt the media packets.

The server needs to authenticate the packet by checking its authentication tag. In an exemplary embodiment of the invention the server calculates an authentication tag (referred to as calculated tag) for the received media packet (243). The process of calculating an authentication tag by the server requires that the server will be provided with a key in a similar manner as was described for the process of building an authentication tag by the speaker. The server compares the calculated tag to the received media packet's tag (246). If the comparison fails the media packet is dropped (249). If the comparison succeeds the media packet is cloned (255), (258), (261) and distributed to all the connected participants and servers (252). Exemplary methods that define to which servers and participants the media packet should be distributed are described in application in the data control method application.

In an exemplary embodiment according to the present invention, if the comparison (246) succeeds, the server optionally decrypts the payload (media data) of each or part of the packets and gets indication on the payload contents in order to decide whether to forward the packet or block its distribution (250), for example the payload may be decrypted in order to test the speaker's volume and decide whether to distribute the packet or not according to the speaker's volume. This decryption step may be performed continuously, at predefined intervals or according to any other method. However, if such decryption is performed it is only done in order to take the decision whether to forward the original packet and there is no need to re-encrypt the packet at the server.

It should be noted that according to the method and system that are described with accordance to exemplary embodiments of the invention, the encrypted media data is not decrypted during its path from the speaker (apart from the case when optional step (250) is performed) and authentication tag is calculated only once at each server. According to an exemplary embodiment of the invention, the media packet is not changed at all at each of the servers on its path.

When the media packet reaches a listener 209 the media packet is received by the listener (270). The listener performs an authentication check of the media packet by calculating an authentication tag for the media packet (273). The process of calculating a tag by the listener is similar to the process that is performed by the server and by the speaker. The calculated tag is compared to the media packet's tag. If the comparison fails, the media packet is dropped and if the comparison succeeds the encrypted media data is decrypted (282). In an exemplary embodiment according to the present invention, decrypted payloads from data packets that were received by the server are optionally being mixed (283) according to a predefined policy and than processed to be presented to the listener (285) for example a digital block of data that represents a speech string will be played by a speaker or earphones.

The ability to encrypt a media packet only once at the speaker's end and to decrypt the media packet only once at the listeners end is an advantage of distributed teleconferencing system and is derived from the distributed flow that doesn't perform mixing activities along the media packets' path apart from at the listener end.

It should be appreciated that the above described methods and systems may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

Section headings are provided for assistance in navigation and should not be considered as necessarily limiting the contents of the section.

It will be appreciated by persons skilled in the art that the present invention is not limited to what has been particularly shown and described hereinabove. Rather the scope of the present invention is defined only by the claims, which follow.

The invention claimed is:

1. A method of providing a secured teleconference in a distributed teleconference system, comprising:
   interconnecting, in a distributed manner, at least one server and at least two participants acting as listeners and associated with a secure teleconferencing application, at least one of the participants also acting as a speaker;
   encrypting data generated by a speaker secure teleconferencing application associated with the at least one participant acting as the speaker;
   building, by the speaker secure teleconferencing application, an authentication tag that verifies the speaker secure teleconferencing application as an approved source of encrypted data;
   transmitting a media packet including encrypted data and the authentication tag built by the speaker secure teleconferencing application to the at least one server;
   checking validity of the transmitted authentication tag by each of the at least one server and selectively distributing the media packet when the authentication tag is determined to be valid;
   checking the validity of the authentication tag, determined to be valid by each of the at least one server, by each participant of the at least two participants acting as listeners that receives the media packet; and
   decrypting the encrypted data when the authentication tag is determined to be valid.

2. The method according to claim 1,
wherein the speaker secure teleconferencing application adds a unique identification indication to the media packet prior to transmitting the media packet to the at least one server.

3. The method according to claim 1,
wherein the speaker secure teleconferencing application adds a header including a unique synchronization source (SSRC) to the media packet prior to transmitting the media packet to the at least one server.

4. The method according to claim 2,
wherein selectively distributing the media packet depends on a number of the at least two participants actively acting as speakers.

5. The method according to claim 4,
wherein selectively distributing the media packet further depends on an identity of the at least one participant acting as the speaker.

6. The method according to claim 3,
wherein encrypting data generated by the speaker secure teleconferencing application is performed by using a key that is provided by the distributed teleconference system for each of the at least two participants.

7. The method according to claim 3,
wherein selectively distributing the media packet depends on decrypting the media packet and obtaining information from at least a portion of the media packet received by the at least one server.

8. The method according to claim 3,
wherein selectively distributing the media packet depends on decrypting the media packet and obtaining information on voice volume from at least a portion of the media packet received by the at least one server.

9. The method according to claim 3,
wherein the media packet is transmitted to each of the at least two participants and each of the at least one server without changing a content of the media packet.

10. A distributed secured teleconference secure system comprising:
at least two servers interconnected in a distributed manner; and
at least two participants each acting as listeners, each connected to one of the at least two servers, and each associated with a secure teleconferencing application, at least one of the participants also acting as a speaker;
wherein the at least one participant acting as the speaker encrypts data generated by a speaker secure teleconferencing application associated with the at least one participant acting as the speaker, builds an authentication tag that verifies the speaker secure teleconferencing application as an approved source of encrypted data, and transmits a media packet including the encrypted data and the built authentication tag to one of the at least two servers,
wherein each of the at least two servers checks validity of the transmitted authentication tag of the media packet and selectively distributes the media packet when the authentication tag is determined to be valid, and
wherein each of the at least two participants acting as the listeners checks the validity of the authentication tag of the media packet, determined to be valid by each of the at least two servers, and decrypts the media packet if the authentication tag is determined to be valid.

11. A distributed secured teleconference secured system, comprising:
at least two servers interconnected in a distributed manner; and
at least two participants each acting as listeners, each connected to one of the at least two servers, and each associated with a secure teleconferencing application, at least one of the participants also acting as a speaker,
wherein each of the at least two servers selectively distributes media packets, including an encrypted payload, intercepted by each of the at least two servers without decrypting the encrypted payload, and checks validity of a transmitted authentication tag in each media packet that verifies a speaker secure teleconferencing application, from which the media packets are received, as an approved source of encrypted data,
wherein the at least two participants each acting as listeners check the validity of the authentication tag, determined to be valid by each of the at least two servers.

* * * * *